Nov. 20, 1923.

E. W. SCHAFER

STEERING WHEEL AND METHOD OF MANUFACTURE

Filed April 17, 1922

1,474,644

Inventor
EARL W. SCHAFER.

By Albert J. Fihe  Atty.

Patented Nov. 20, 1923.

1,474,644

UNITED STATES PATENT OFFICE.

EARL W. SCHAFER, OF CHICAGO, ILLINOIS.

STEERING WHEEL AND METHOD OF MANUFACTURE.

Application filed April 17, 1922. Serial No. 554,297.

*To all whom it may concern:*

Be it known that I, EARL W. SCHAFER, a citizen of the United States, residing at Chicago, in the county of Cook, in the State of Illinois, have invented certain new and useful Improvements in Steering Wheels and Methods of Manufacture, of which the following is a specification.

This invention relates especially to automobile steering wheels, and has for one of its objects the provision of such a steering wheel which shall be more readily and economically manufactured than by the methods now in use and which, in its finished state, shall present a product less liable to breakage or disruption.

An important object of this invention is the provision of an automobile steering wheel having a wooden rim mounted upon a metallic spider, which shall be assembled by bending the arms of the metallic spider into position, and which shall be held in completed form by the natural resistance to deformation which exists in the material of the metallic spider.

Another and further important object of this invention is the manufacture of an automobile steering wheel comprising a wooden rim having inwardly tapering sockets or depressions formed at regular intervals on its inner face and a metallic spider for the same, provided with arms having their ends so shaped as to correspond with the tapered sockets in the wooden rim. The arms are provided with points which penetrate the material of the rim to some degree. A novel method of assembly is likewise provided.

Other and important objects of this invention will be apparent from the disclosures in the accompanying drawings and following specification.

The invention, in a preferred form, is illustrated in the drawings and hereinafter more fully described.

Figure 1:
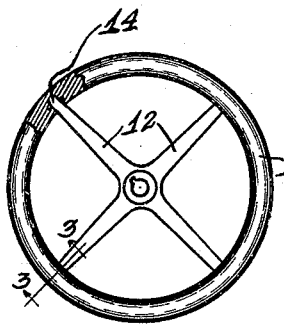
Figure 1 is a plan view of an automobile steering wheel embodying the invention, parts being broken away.

The reference numeral 10 indicates the rim of an automobile steering wheel preferably of wood, but which obviously may be of any other suitable material. This rim 10 is mounted upon a spider 12 formed as shown in the drawings, in the usual shape, but which is composed of a special material or metal, which when the arms of the spider are flexed slightly from their original shape, preferably downwardly, between two plates of a die or press, will retain the new position and shape, having the points of the arms embedded in the material of the rim.

Figure 3:
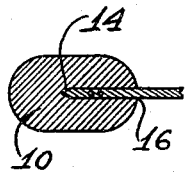
Figure 3 is a sectional view taken on the line 3—3 of Fig. 1.

As best shown in Figures 1 and 3, each of the arms of the spider 12 is pointed at its end somewhat in the manner of a four-sided wedge having its sides 14 converging toward a point. Depressions 16 shaped to correspond substantially with the ends of the spider arms are provided in the inner face of the rim 10, and in order to insure an accurate and close fitting joint, the points at the ends of the arms are embedded slightly in the rim and the sockets 16 may be filled in with putty and varnish, or similar material, after the assembly of the rim and spider has been completed.

Figure 2:
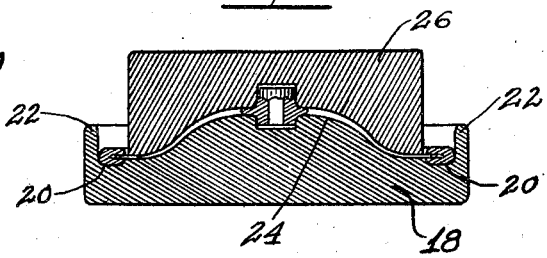
Figure 2 is a view showing the method of assembly.
Figure 4:
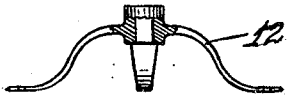
Figure 4 is a view showing the shape of the spider as preliminarily manufactured.
Figure 6:
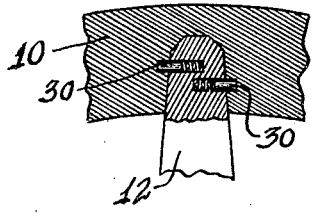
Figure 6 is a detail view of an improved locking means.
Figure 5:
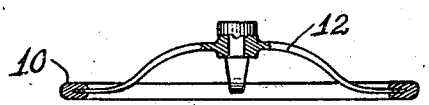
Figure 5 is a view showing the final shape of the spider when applied to a rim.

The assembly of the spider and rim is accomplished by means of a die or press as shown in Figure 2, the press consisting of a steel plate 18 or the like having an annular groove 20 therein, preferably flanged by an upstanding circular element 22. The inner face of the plate 18 is provided with a hump or elevation 24 as shown in the drawings adapted to correspond generally with the finished shape of the arms 12 of the spider. An upper die element 26 is likewise provided, which co-operates with the lower die member 24 and acts to compress the spider from the shape shown in Figure 4 to the final finished shape as illustrated in Figure 5 wherein the arms 12 enter and penetrate the depressions 16 in the rim. Any suitable locking means may be provided, such as spring impelled rods 30, a plug, or a flared hook.

The method of assembly is as follows:

The rim 10 is preliminarily manufactured as an integral unit, this being accomplished in any convenient manner known to the trade. Preferably, the rim is composed of a number of separate units jointed and dovetailed together to form an approximate circle, after which the same is subjected to considerable pressure in a hydraulic press or the like and then finally shaped, finished and polished.

After the completed unitary rim is ready, a number of depressions 16, usually four in number, are drilled or routed into the inner face of the rim in order to receive the ends of the arms of the spider 12.

As best shown in Figure 2, the spider 12 which has been preliminarily manufactured, preferably by forging or casting a metal having great tensile and compression strength but possessing sufficient resilient qualities so as to allow of its arms being slightly flexed so as to position them in assembled relation with the rim 10. In the original manufactured shape shown in Fig. 4 the arms 12 have a more pronounced curve than when in assembled relation with the rim as shown in Fig. 5. This bending of the arms of the spider 12 serves to increase the length of the diameter of the circumference in which the points 14 of the spider lie. In this manner, the rim 10 may be first slipped over the ends of the arms 12 and when the sockets 16 have been correctly positioned with relation to the points 14, tension on the spider is applied and the same pressed into position, thereby forming a complete steering wheel.

It will be seen that this method of assembly is far superior to the process now in use for manufacturing similar rims when the spider is embedded in the rim. The present process necessitates the manufacture of a wheel as an integral member, whereby the rim and spider are carried through the different steps of manufacturing and assembling together, resulting in a more tedious and slower operation, with consequently increased expense. Further, by the ordinary method of manufacture in which the wooden rim is assembled and formed while in position on the spider, it oftens happens that the centers of the rim and spider do not coincide and an imperfect product is formed and one which is much more likely to break or come apart under the conditions of ordinary or extraordinary use imposed upon it.

I am aware that many changes may be made and numerous details of construction varied throughout a wide range without departing from the principles of this invention, and I therefore do not purpose limiting the patent granted hereon otherwise than as necessitated by the prior art.

I claim as my invention:—

1. In a steering wheel, a spider having outwardly and upwardly extending arms provided with oppositely disposed transversely arranged locking pins, and a rim having a plurality of radial sockets corresponding to said arms and opening only upon the inner surface of said rim, each of said sockets being provided with tangential recesses coinciding with said pins.

2. A steering wheel as described in claim 1, and in which said pins are spring actuated and are adapted to be compressed into the arm of said spider for the purpose of aiding insertion of said arm into said rim.

3. A steering wheel, comprising in combination, a rim and a spider therefor, said spider having a plurality of locking pins for insertion in said rim at right angles to the material of said spider, the spider and rim being retained in assembled relation because of the natural resistance to flex inherent in the material of the spider.

In testimony whereof I have hereunto subscribed my name in the presence of two subscribing witnesses.

EARL W. SCHAFER.

Witnesses:
 JAMES P. WILLSON,
 N. S. WILLSON.